Feb. 18, 1964     C. E. PATTERSON     3,121,287
TAP SHOES AND TAPS THEREFOR
Filed Sept. 13, 1961
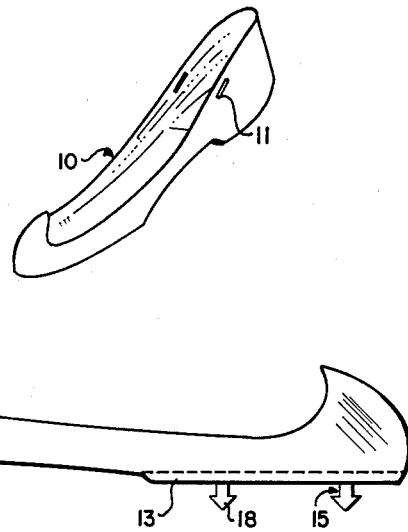
Fig 1
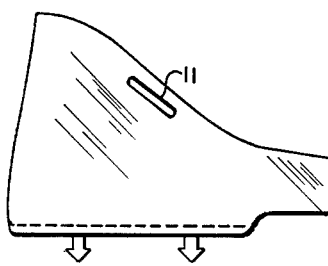
Fig 2
Fig 3
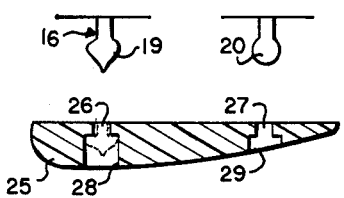
Fig 4
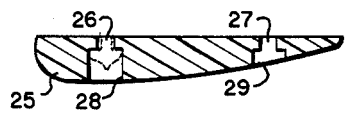
Fig 5
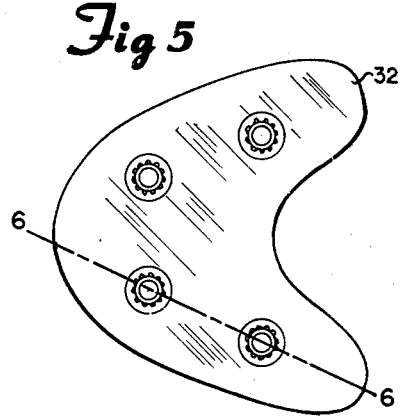
Fig 6
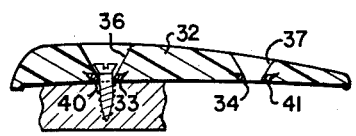
CHARLES E. PATTERSON
INVENTOR.
BY Edward C Walsh

United States Patent Office 3,121,287
Patented Feb. 18, 1964

3,121,287
TAP SHOES AND TAPS THEREFOR
Charles E. Patterson, 2195 "D" St., San Bernardino, Calif.
Filed Sept. 13, 1961, Ser. No. 137,792
1 Claim. (Cl. 36—8.3)

This invention relates to a novel and improved tap made of particular materials for tap shoes and a novel and improved tap shoe which may be combined with the improved tap.

The improved tap sole or tap of the invention is one made of a non-metallic material which is preferably a high-impact styrene or a phenolic plastic. This is a very durable material. Taps for tap shoes have in the past ordinarily been made of metal. Such taps, as is well known, mark and mar the dance floor leaving marks that are extremely difficult or impossible to remove. These marks are dark or black in color and are unsightly. The objective achieved by the non-metallic taps is to prevent this marking and marring and abrasion when the tap strikes or is slid across the surface of the floor.

The invention provides improvements making it possible to use the aforesaid non-metallic material for taps. Tap soles or taps are ordinarily attached by screws or nails extending through holes in the taps with a loose fit. The taps of this invention are provided with metallic re-inforcing eyelets molded into the taps around the attachment holes therein. This makes possible the use of the non-metallic material which would otherwise be unsatisfactory due to the wear and abrasion of the attaching holes by the screws or nails extending through them. To satisfactorily realize the fabrication of taps with the metallic reinforcers therein requires particular techniques in the molding process which is ordinarily an injection molding process, as will be described more in detail hereinafter.

The taps, as described, may be utilized with a slip-on tap shoe whereby any ordinary shoe may be quickly converted into a tap shoe simply by putting the slip-on over it. The body of the slip-over shoe is preferably made of a flexible and elastic material such as polyethylene or the like. The slip-on shoe has a thicker sole to facilitate the attachment of, and securement of taps. In this form of the invention, preferably the taps are secured to the slip-on shoe by way of headed projections extending from the sole of the slip-on shoe and molded integrally therewith. The projections have heads of particular, preferred shapes; the projections are resilient or flexible sufficiently so that they may be forced through openings in the tap and to then expand and to fit within and be held within, preferably, square counterbores in the tap. This makes possible an inexpensive and simplified slip-on tap shoe not requiring any additional or separate means for attaching the taps. The realization of this result is one of the objects of the invention. As stated, the projections may be molded with the slip-on shoe so that the shoe is complete merely by ataching the taps in the manner described.

Further objects and additional advantages will become apparent from the following detailed description, claim and annexed drawing wherein:

FIGURE 1 is a perspective view of the slip-on shoe of the invention;

FIGURE 2 is a side view of the shoe;

FIGURE 3 is a detail view of two forms of projections extending from the sole of the shoe;

FIGURE 4 is a sectional view of a preferred form of tap used with the shoe of FIGURES 1 and 2;

FIGURE 5 is a view of a preferred form of non-metallic tap of the invention;

FIGURE 6 is a sectional view taken along the line 5—5 of FIGURE 5.

Referring now more in detail to FIGURES 1 to 4 of the drawing, numeral 10 designates a preferred form of slip-on tap shoe of the invention. The shoe, as shown, is in the form of a slipper, having the general configuration shown so that it may be slipped on over an ordinary street shoe. It is made from flexible or resilient material such as polyethylene, which is light and will hold onto a shoe very well. The sides of the shoe have openings, as shown at 11, for attachment of a strap fastening over the instep of the wearer.

The shoe may be integrally molded by various molding processes and preferably, has a thickened sole, as shown at 13, so as to make it slightly more rigid than the remainder of the shoe. Molded integrally with the shoe and extending downwardly from the sole are projections, as shown at 15, for securing the taps. FIGURE 2 shows one configuration of these projections but at the present time it is considered that the configuration shown at 16 in FIGURE 3 is preferred. The projections have narrowed necks, as shown, and heads having any of various shapes such as those shown at 18, 19 and 20. The heads may be conical as shown at 18; rounded with a taper, as shown at 19; or bulbous and rounded, as shown at 20.

Numeral 25 designates a preferred form of tap to be used with the shoe of FIGURES 1 and 2. This tap is preferably made of a non-metallic material, preferably a high-impact styrene or phenolic plastic, for the purposes set forth in the foregoing. The tap has attachment holes, as designated at 26 and 27 and counterbores as shown at 28 and 29. The heads on the projections are sufficiently flexible and resilient so that they can be forced through the openings 26 and 27. The heads then expand in the counter-bores 28 and 29 and are held therein to hold the tap onto the sole of the shoe. In this manner, a complete slip-on tap shoe can be fabricated and assembled very quickly, very conveniently and inexpensively, providing a very effective and light tap shoe. No separate attachment or securement means are required. As known in the art, ordinarily taps are attached by nails or screws having a loose fit in the openings in the taps. The taps 25 may be attached in this manner, or if desired, the necks of the projections might be made to fit tight in the openings 26 and 27. Taps like that of FIGURE 4 may of course be made of any material for use with the securement means of FIGURES 1 to 3.

FIGURES 5 and 6 show a preferred form of tap made of a non-metallic material, that is, a material as referred to in the foregoing, adapted for use with or attachment to any tap shoe. A representative shape of the tap is shown at 32 in the figures. The tap is made of a plastic material, as described in the foregoing. The tap, as shown, is of a type adapted for attachment by means of screws, for example, and in this instance screws having a conical or tapered head. The tap has bores or holes, as shown at 33, and 34, having tapered counter-bores 36 and 37 to receive the heads of the attaching screws. As stated, ordinarily the shanks of the attaching screws fit loosely in the bores 33 and 34. Molded into these bores are metal reinforcing eyelets 40 and 41 which preferably have toothed peripheries, as shown, to securely hold them in place, their inner surfaces being flush with the inside of the bores 33 and 34 and counter-bores 36 and 37. The use of these reinforcing means makes possible the utilization of the non-metallic, that is, the plastic material in the tap rather than a metallic material. The metal reinforcing eyelets or inserts protect the plastic from wear and abrasion occasioned by the friction of the attaching screws against the inside of the holes. Without the reinforcements, the holes in the tap would soon wear out requiring replacement of the entire tap.

The fabrication of the taps with the reinforcing eyelets therein, as described, requires particular molding techniques. In one exemplary form of this molding technique, the taps may be molded in a mold having upper and lower parts which are in a horizontal position during the molding. The reinforcing eyelets may be placed in the mold in the proper position and are held there while the fluid material is injected or otherwise placed into the mold so that the fabrication of the finished article in the manner desired becomes simplified.

From the foregoing, those skilled in the art will observe that the invention, as described herein, achieves all of the objects and advantages stated in the foregoing, as well as those that are apparent from the detailed description. A tap for tap shoes is provided which overcomes successfully, the marked disadvantages inherent in the use of metal taps which mark a dance floor as described herein. The invention provides simplified and effective ways of realizing successfully such taps. The invention further provides a very useful, effective, but light and inexpensive tap shoe which may be very easily fabricated. This shoe has the distinct advantage of not requiring separate attachment and securement means for the taps and may be readily and effectively assembled and made ready for usage.

The foregoing disclosure is representative of preferred forms of the invention and is to be interpreted in an illustrative rather than a limiting sense, the invention to be accorded the full scope of the claim appended hereto.

What is claimed is:

A tap shoe formed from a relatively flexible plastic material, said tap shoe having a sole and the sole having extending therefrom integrally formed resilient projection members having enlarged heads and narrow necks, a solid plastic tap adapted to be attached to the shoe having openings therein, said openings including relatively smaller bores, and relatively larger counter bores extending entirely through the tap whereby the heads of the projections on the shoe may be inserted through the openings in the tap with the heads thereof expanded to be held in the counter bores whereby the tap is firmly secured to the shoe, the engagement of the said projection members in the said counter bores being the sole securement means attaching the tap to the shoe.

References Cited in the file of this patent

UNITED STATES PATENTS

| | | |
|---|---|---|
| 1,298,104 | Schrade | Mar. 25, 1919 |
| 1,542,602 | Buckner | June 16, 1925 |
| 1,740,976 | Farrar | Dec. 24, 1929 |
| 1,986,727 | Hall | Jan. 1, 1935 |
| 2,109,712 | Schmalz | Mar. 1, 1938 |
| 2,124,458 | Buckler | July 19, 1938 |
| 2,746,175 | Root | May 22, 1956 |
| 2,758,396 | Edwardes | Aug. 14, 1956 |
| 2,803,070 | Passidomo et al. | Aug. 20, 1957 |
| 3,007,260 | Stone | Nov. 7, 1961 |

FOREIGN PATENTS

| | | |
|---|---|---|
| 298,838 | Great Britain | Oct. 18, 1928 |